United States Patent [19]

Suzuki

[11] 4,043,830

[45] Aug. 23, 1977

[54] METHOD OF CONSOLIDATING POOR QUALITY SOILS

[75] Inventor: Manao Suzuki, Tokyo, Japan

[73] Assignee: Kyokado Engineering Co., Ltd., Tokyo, Japan

[21] Appl. No.: 618,773

[22] Filed: Oct. 2, 1975

[51] Int. Cl.² .......................... C09K 3/00; E02D 3/12
[52] U.S. Cl. ................................ 106/287 SS; 61/36 B
[58] Field of Search ................... 106/287 SS, 287 SC; 166/293–295; 61/36

[56] References Cited

U.S. PATENT DOCUMENTS

| | | | |
|---|---|---|---|
| 3,180,098 | 4/1965 | Spencer | 106/287 SS |
| 3,306,758 | 2/1967 | Miller | 106/287 SS |
| 3,865,600 | 2/1975 | Pearson | 106/287 SS |

*Primary Examiner*—Theodore Morris
*Attorney, Agent, or Firm*—Martin A. Farber

[57] ABSTRACT

A method of consolidating a poor quality soil or a water leaking soil by injecting hardeners thereinto, in which a mixture of water and gelling agent and a water glass aqueous solution containing gelling agent are employed as said hardeners, said hardeners are joined together and injected into said soil, whereby to modify the soil into a uniformly and strongly consolidated soil or water-tight soil.

6 Claims, No Drawings

METHOD OF CONSOLIDATING POOR QUALITY SOILS

BACKGROUND OF THE INVENTION

This invention relates to a method of consolidating poor quality soils, and in particular to a method of consolidating soils in which a poor quality solid or a water leaking soil is modified into a uniformly and strongly consolidated soil or a water-tight soil.

In this specification, the term "a poor quality soil or a loose soil" is intended to designate a loose or water leaking soil encountered in building foundation excavation work or in subway (or underground railway) excavation work. The term "consolidation of a poor quality soil" is intended to mean that various hardners are injected into a poor quality soil to consolidate the latter, thereby to provide a strong and water-proof soil or a water-tight soil.

In general, such a poor quality soil is formed by a coarse soil layer (including air gaps) and a fine soil layer mutually overlapped or laid one on another. Accordingly, it is necessary to consolidate the poor quality soil by injecting hardeners thereinto.

In this invention, the uniform consolidation of a poor quality soil means that both of the coarse soil layer and the fine soil layer mentioned above are consolidated thereby to improve not only the strength but also the water-tight characteristic of the soil. The consolidation of only one of the two layers forming the soil cannot be regarded as the uniform consolidation of the soil intended by this invention, and cannot increase the strength of the soil nor provide a water-tight soil.

The following method of consolidating a poor quality soil is well known in the art:

1. Dual-Liquid Water Glass Method

In this conventional method, an aqueous solution of inorganic gelling agent or a suspension containing cement (liquid-A) and a water glass aqueous solution (liquid-B) are employed as hardeners. These hardeners, or the liquid A or the liquid B, are joined together by a Y-shaped pipe, and the resultant liquid (hereinafter referred to as an liquid-AB) is injected into a soil to be consolidated. This method is simple in operation and superior in consolidation; however, it suffers from the following disadvantages.

A. The liquid-A and the liquid-B are hardeners which will cause reaction by blending and consolidate. However, if they are left as unreacted materials in a soil, it will cause a problem such as water pollution. Especially, if the liquid-B is left as an unreacted material in a soil, it leaks into the subterranean water in the soil thus causing a serious public hazard. Accordingly, in order to overcome this difficulty, or in order not to leave such an unreacted material in the soil, it is necessary to join the liquid-A and the liquid-B together at a certain ratio thereof.

However, to do so practically is extremely difficult. Especially, in the case where the injection pressures of the liquids are high or the injection quantities of the liquids are little, the injection ratio of the liquid-A to the liquid-B greatly fluctuates, and at worst only one of the two liquids is injected. Accordingly, in this conventional method, the unreacted material is liable to be left in the soil, which leads to the occurrence of a public hazard such as water pollution.

B. Upon blending, the liquid-A and the liquid-B are quickly gelatinized. In the case where the liquid-A contains cement, the liquid obtained by joining the liquid-A and the liquid-B becomes a suspension since the liquid-A containing the cement is also a suspension. Accordingly, the liquid-AB is poor in permeability and therefore cannot permeate further than a coarse soil layer.

Thus, in this method, a fine soil layer is scarcely permeated by the hardeners, as a result of which the soil treated by this method is undoubtedly ununiform in quality.

2. Water Glass Injection Method Utilizing Organic Gelling Agent

This conventional method is a solution type water glass utilizing aldehyde compound or ester as a gelling agent, and its gelation time can be made considerably long. Accordingly, in this method, the liquid-joining step as described above in unnecessary, and further, the water glass and the gelling agent are accurately compounded in advance and injected by a so-called one shot method. Furthermore, since it is a solution type-chemical liquid, it can be uniformly injected into a fine soil layer. However, this conventional method also has a difficulty. That is, since the gelling agent is an aqueous solution, the hardener has an excellent permeability. Owing to this characteristic, the hardener is liable to leak from the air gaps or the coarse soil layer into a part of the soil other than injected. Therefore, it is difficult to consolidate great air gaps and a coarse soil layer in a soil to be consolidated. Accordingly, it is also difficult to form or obtain a uniformly consolidated soil by this conventional method.

SUMMARY OF THE INVENTION

Accordingly, a primary object of this invention is to provide a method of consolidating a poor quality soil in which no leakage of hardeners into subterranean water is caused and accordingly no public hazard such as water pollution is caused.

Another object of the invention is to provide a method of consolidating a poor quality soil in which consolidation is effected throughout a coarse soil layer and a fine soil layer thereby to provide a uniformly consolidated soil.

A further object of the invention is to provide a method of consolidating a poor quality soil by which a soil consolidated high in strength is provided.

A still further object of the invention is to provide a method of consolidating a poor quality soil by which a soil consolidated completely water-tight is provided.

A particular object of the invention is to provide a method of consolidating a poor quality soil in which hardeners are permeated into a soil in a desired direction thereby to consolidate a desired portion of the soil.

The foregoing objects and other objects are achieved by the provision of a method of consolidating a poor quality soil by injecting hardeners thereinto in which according to this invention, a mixture obtained by mixing water and gelling agent and a water glass aqueous solution containing gelling agent are employed as the hardeners, and these hardeners are joined together and injected into the soil, the gelling agent being selected from the group consisting of ester, aldehyde, inorganic acid, organic acid, inorganic salt, organic salt, cement and hydraulic component of cement.

DETAILED DESCRIPTION OF THE INVENTION

A soil consolidating method according to this invention will be described with reference to concrete examples.

First of all, a liquid obtained by mixing water and a gelling agent (hereinafter referred to as "an liquid-A" when applicable) and a water glass aqueous solution containing a gelling agent (hereinafter referred to as "a liquid-B" when applicable) are prepared respectively. As is apparent from the above, the liquid-A may be called as a gelling agent aqueous solution, but may be replaced by a cement suspension, or by a cement suspension including clay such as bentonite or sand. The water glass aqueous solution, namely, the liquid-B is so prepared as to have a relatively long gelation time so that it is not gelatinized before it is injected into a soil.

Most of the water glasses employed are of a mole ratio ranging from 1.5 to 5.0, and the gelling agents employed are for instance as follows:

Esters

Fatty acid esters of monohydric alcohol, such as ethyl acetate, methyl acetate, butyl acetate and amyl acetate.

Fatty acid esters of polyhydric alcohol, such as ethylene glycol diacetate, glycerin triacetate and diester of succinic acid (fully esterified).

Intermolecular esters such as ⊕-yrolactone and ϵ-caprolactam. (cyclic esters: Lactones)

Partially esterified esters of polyhydric alcohol, such as ethyleneglycol mono-formate, ethyleneglycol mono-acetate, ethyleneglycol mono-propionate, glycerin mono-formate, glycerin mono-acetate, glycerin mono-propionate, glycerin di-formate, glycerin di-acetate, sorbitol mono-formate, sorbitol mono-acetate, glucose mono-acetate, and partially saponificated vinylacetate (low grade polymerization).

Unsaturated fatty acid esters such as diacetoxyethylene

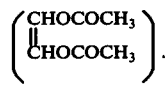

Carbonates such as cyclic carbonate, for example ethylene carbonate, propylene carbonate and glyceryl carbonate.

Aldehydes

Dialdehydes such as glyoxal, succindialadehyde, malondialdehyde succinaldehyde, glutaraldehyde, and furfuraldialdehyde.

Acids

Inorganic acids such as sulfuric acid, hydrochloric acid and phosphoric acid.

Organic acids such as malonic acid, succinic acid, maleic acid, and tartaric acid.

Inorganic salts

Chlorides or hydrochlorides such as calcium chloride, sodium chloride, potassium chloride, ammonium chloride, zinc chloride, and aluminium chlorides.

Sulfates such as sodium sulfate.

Aluminates such as sodium aluminate and potassium aluminate.

Chlorates such as sodium chlorate, potassium chlorate, sodium perchlorate and potassium perchlorate.

Carbonates such as ammonium carbonate, sodium bicarbonate, potassium bicarbonate and ammonium bicarbonate.

Bisulfates such as sodium bisulfate, potassium bisulfate and ammonium bisulfate.

Bisulfites such as sodium bisulfite, potassium bisulfite and ammonium bisulfite.

Fluosilicates such as sodium silicofluoride and potassium silicofluoride.

Borates such as sodium borate, potassium borate and ammonium borate.

Hydrogen phosphates such as sodium hydrogen phosphate, potassium hydrogen phosphate and ammonium hydrogen phosphate.

Pyrosulfates such as sodium pyrosulfate, potassium pyrosulfate and ammonium pyrosulfate.

Pyrophosphates such as sodium pyrophosphate, potassium pyrophosphate and ammonium pyrophosphate.

Bichromates such as sodium bichromate, potassium bichromate and ammonium bichromate.

Permanganates such as potassium permanganate and sodium permanganate.

Ca, Al, Mg or Fe salts such as lime, gypsum, alumina, iron oxide, magnesium oxide, slug, calcium silicate and clay, each of which produces silicates by reaction with silicic acid.

Organic salts

Sodium acetate, sodium succinate, potassium formate, sodium formate, etc..

Cements

Portland cement, Portland blast furnace cement, slug cement, colloidal cement etc..

Hydraulic component of cement

This means supernatant liquid of cement suspension, and is prepared by mixing water and cement with agitation to obtain a cement suspension, and then standing the same for about few minutes to obtain supernatant liquid in the top of the suspension. This may also be prepared by mixing water glass, water and cement in the same manner as mentioned above. In this case, the supernatant liquid obtained is directly employed as liquid-B.

The liquid-A and liquid-B described above are joined together by the use of, for instance, a Y-shaped pipe and are injected into a poor quality soil (or a loose soil) through an injecting pipe.

The liquid obtained by joining the liquids-A and B (hereinafter referred to as "an liquid-AB" when applicable) is gelatinized much more quickly by the action of the gelling agent included in the liquid-A than the gelation time of the liquid-B. The gelation time can be adjusted as desired by suitable selecting a compounding ratio of the quantity of the gelling agent included in the liquid-A to the quantity of the liquid-B.

In the method of this invention as described above, even if a ratio of the feeding rate (or a flow rate) of the liquid-A to that of the liquid-B is fluctuated or varied, first the gelation of the liquid-AB causes a coarse soil layer to consolidate, and then the liquid-B permeates a fine soil layer to consolidate the latter, as a result of which both of the fine and coarse soil layers are consolidated to form a hardened soil which is uniform in quality and strong. Therefore, if the method of this invention is applied to a soil, the uniform consolidation of the soil accompanying the conventional soil consolidating method in which only the coarse soil layer is consolidated but the fine soil layer is not consolidated, or only the fine soil layer is consolidated but the coarse soil layer is not consolidated, can be completely avoided. In the method of the invention the liquid-AB and the liquid-B serve to consolidate the coarse soil layer and the fine soil layer, respectively, and therefore the method may be called as "a multiple grouting method". Since the liquid-B is capable of consolidating itself (if the liquid-A is a cement suspension, the liquid-A also can consolidate itself), the liquid-B positively consolidates itself without any other aid. Accordingly, the liquid-B never goes out of the liquid injection range or area, that is, the liquid-B never flows into subterranean water for instance. This means that the method of this invention causes no problem of public hazard or pollution. Thus, such preferable effects or merits as described above can be obtained without the control of the flow rates of the liquid-A and the liquid-B.

Another method of this invention will now be described, in which after a predetermined quantity of the liquid-AB has been injected into a soil, the feeding of the liquid-A is suspended and accordingly only the liquid-B is injected.

In this operation, since the liquid-AB injected first has a relatively short gelation time as was described before, the liquid-AB permeates and fills large air gaps, the interfaces of strata and a coarse soil layer (these being referred to as "a coarse soil layer") and consolidates soon. Then, the injection and accordingly the feeding of the liquid-A is suspended, and the injection of the liquid-B is continuously carried out. Since the liquid-AB has been injected into the coarse soil layer described above, the liquid-B (which is superior in permeability because it is an aqueous solution, and whose gelation time can be adjusted to be relatively long) permeates the fine soil layer little by little, and soon completely fill and consolidate the latter.

Thus, the hardener consolidates the loose soil by continuously advancing from the coarse soil layer to the fine soil layer, thereby more readily forming a uniformly consolidated strong soil.

In this method it is necessary to successively inject the liquid-AB and the liquid-B in the order described. In this successive injection operation, since the liquid-B is injected before the liquid-AB is completely cured in the course soil layer, the liquid-B permeates the fine soil layer by breaking the layer or layers of the liquid-AB. Accordingly, the penetration of the liquid-B into the fine soil layer can be readily achieved (the successive injection operation may be repeatedly performed). In addition, since the gelation time of the liquid-B can be adjusted to be relatively long, it is possible to cause the liquid-B to permeate a fine soil layer in a wide range.

In this invention, in the case where the liquid-A is a cement suspension, surfactant may be employed in order to improve the dispersibility of the gelling agent included in the liquid-B.

Furthermore, in order to join the liquid-A and the liquid-B together, a dual injection pipe or two injection pipes arranged in parallel may be employed in place of the Y-shaped pipe described above. In this case, the pipe or pipes are inserted into a soil to be consolidated, and the liquid-A and the liquid-B may be joined together immediately before or after the two liquids are discharged out of the respective outlets, or the two liquids may be joined together at the instant when they come out of the respective outlets.

In the present invention, the injection of the hardener into a soil may be carried out in a variety of ways. For instance, the injection of the hardener can be achieved by a very simple rod injection technique. However, this rod injection technique suffers from the following disadvantages. That is, in this technique an air gap is caused between the boring rod and the soil, and accordingly the hardener gushes out through the air gap thus caused in the surface of the earth, as a result of which it is difficult to allow the hardener to permeate the fine soil layer. In order to overcome this difficulty, it may be necessary to make the gelation time of the hardener shorter. However, this adjustment of the gelation time of the hardener will cause another difficulty that it is still difficult to allow the hardener to permeate the soft soil layer because the hardener is gelatinized so much quickly. However, these problems accompanying the rod injection method can be solved completely if the method according to the invention is combined with the rod injection method. And moreover the merit of the rod injection method, that is, the simplicity of operation can be effectively utilized by the application of the invention thereto. More specifically, by the injection of the liquid-AB obtained by joining the liquid-A and the liquid-B, the above-mentioned air gaps and other large air gaps in the soil are filled with the hardener of the liquid-AB which is quick in gelation time and great in strength. Thereafter, the injection of the liquid-A is suspended, and only the liquid-B is injected. In this case, since those air gaps have been filled and consolidated by the liquid-AB, the liquid-B does not flow to the air gaps nor to the surface of the earth, that is, the liquid-B can completely permeate the fine soil layer. Upon injection of a necessary amount of the liquid-B, the boring rod is moved upward to a suitable height, and the injection operation as described above is carried out. The rod is further moved upward, and the injection operation is repeated. In this way, the method according to the invention combined with the rod injection method can be readily carried out.

As is described above, one of the specific features of this invention resides in that the grouting of the liquid obtained by joining the liquid-A and liquid-B together is ingeniously and skillfully combined with the grouting of the liquid-B. Accordingly, the method of this invention can provide significant effect in the considation of soils although it is considerably simple in all the operational respects.

The method according to this invention may be modified so as to meet the conditions of soil to be consolidated thereby. For instance, in the case when the method of this invention is applied to soils where water gushes out, the method may be repeatedly carried out by observing the water gushing conditions. Alternatively, first the liquid-A or the liquid-B only is injected, and thereafter the liquid-A and the liquid-B may be joined together. Furthermore, the method according to the invention may be modified as follows: The liquid-A described above and a water glass aqueous solution without the gelling agent (hereinafter referred to as "a liquid-B" when applicable) are employed as hardeners. The two liquids, namely, the liquid-A and the liquid-B' are joined together and injected into soil (which may be replaced by joining the two liquids after the injection of the liquid-A only), and then the liquid-B is prepared by adding the gelling agent to the liquid-B or the liquid-B' is changed into the liquid-B during the injection, and simultaneously the injection of the liquid-A suspensed to continue the injection of the liquid-B only. This method is most applicable to the case where a soil receives a large amount of hardener. In this case, the discharging quantity of the injection pump is, of course, large, and therefore it is possible to maintain relatively accurate the combination ratio of the liquid-A to the liquid-B. Accordingly, the liquid-B will never flow, as an unreacted material, into subterranean water. This means that the method causes no public pollution.

In the above-described method, the following series of steps or operations may be repeatedly carried out; the step of injecting the combined liquid into the soil, the step of changing the water glass aqueous solution (liquid-B) without the gelling agent into the water glass aqueous solution (liquid-B) with the gelling agent, and the step of suspending the joining operation of the aqueous solution and the liquid (liquid-A) obtained by mixing water and the gelling agent.

The liquid-B is prepared by mixing the water glass aqueous solution and the gelling agent in the mixer and is pumped out whereby the accurate compounding ratio thereof can be obtained and the liquid-B thus prepared can permeate a soil. However, it goes without saying that the preparation of the liquid-B may be achieved by transferring or feeding the water glass aqueous solution and the gelling agent to a Y-shaped pipe by the use of the respective transferring systems.

As is apparent from the above description, the specific feature of the invention resides in that the combination of the liquid-A and the liquid-B, and the liquid-B are successively injected into a soil to be consolidated. If the injection of the liquid-B is conducted at a long time interval after the injection of the liquid-AB, it will take much time to carry out the re-boring, and the permeation of the liquid-AB is obstructed by the hard gel of the grout of the liquid-AB which was consolidated before the permeation of the liquid-B, because the liquid-AB is quickly gelatinized and the gel thereof is hard. However, since in the invention the liquid-AB and the liquid-B are successively fed into the soil, that is, the injection of the liquid-AB is immediately followed by the injection of the liquid-B, the grout of the liquid-B can break the grout of the liquid-AB before the latter liquid is fully gelatinized. Accordingly, the injection of the liquid-B is not obstructed by the liquid-AB.

Furthermore, the method according to this invention may be so modified that with respect to the combination of the hardeners the jet stream of the liquid-B is applied to a soil to be consolidated thereby to cut or loosen the soil in advance, and the liquid-A is injected into the soil thus treated thereby to join the hardeners in the soil. This method will be described in more detail.

First, a bore is made in a poor quality soil or a loose soil, and an injection pipe such as a dual pipe consisting of an outer pipe and an inner pipe inserted in the former, is inserted in the bore thus made. The outer pipe of the dual pipe has an open and, the diameter of which is for instance 90 mm; however, a variety of outer pipes having different diameters are available. On the other hand, the inner pipe has a closed end, on the wall of which jet holes (nozzles) are provided. The diameter of the inner pipe is optional, for instance 40 mm (smaller than the diameter of the outer pipe). The inner pipe should be inserted into the outer pipe so that the end portion, where the jet holes are provided, of the inner pipe are protruded from the open end of the outer pipe.

The liquid-B is jetted at for instance several tens of $kg/cm^2$ – $1000 kg/cm^2$ or preferably at 100 – 500 $kg/cm^2$ into the soil through the inner pipe thereby to cut or loosen the soil. Thereafter, the liquid-A is injected (at a pressure of approximately 10 $kg/cm^2$) into the soil thus treated. In this connection, a high pressure jet stream of the liquid-A should not be applied to the soil due to the following reason. In the case where the liquid-A is a cement suspension, the high pressure jet stream of the cement suspension will cause the nozzles of the inner pipe to be worn or clogged up.

The liquid-A and liquid-B thus injected are joined and consolidated inside the soil. Then, the dual pipe is gradually moved upward while being rotated, and the cutting and loosening of the soil and the joining the liquids described above are continuously effected. Thus, the cut or loosened portions of the soil is consolidated in the form of a column. If the dual pipe is moved upward without rotation, a film-like consolidated body (a consolidated film) is formed. (The direction of permeation is determined by the jet, which leads to the formation of the film-like consolidated body.)

In such a high pressure jet stream method as described above, as was described no public pollution is caused regardless of the compounding ratio of the hardeners, and not only the coarse soil layer but also the fine soil layer are consolidated, thus changing the loose soil into a uniformly and strongly consolidated multiple soil. Since in this method the soil is cut and loosened by the use of the liquid-B, the permeation of the hardeners is considerably improved. In addition, the cutting and the loosening of the soil can be effected in a desired direction, and therefore the permeation of the hardener can be orientated as desired. (In the case where the liquid-A is a cement suspension, almost all of the liquid-A is detained at the coarse soil layer, that is, it does not go further, and is joined with the liquid-B there, and is gelatinized in a short time.)

As is apparent from the above description, according to the high pressure jet stream method, the hardener (grout) essentially using the liquid obtained by joining the liquid-A and the liquid-B serves to strongly consolidate the coarse soil layer (thereby to increase the strength of the soil), while the hardener (grout) essentially utilizing the liquid-B serves to consolidate the fine soil layer (thereby to completely achieve the stopping of water flowing). As a result, both of the coarse soil layer and the fine soil layer are uniformly consolidated into one unit, whereby a uniformly and strongly consolidated soil in which the stopping of water flowing is completed is provided.

This invention will be described in more detail by presenting a variety of examples.

EXAMPLE 1

1. A number of liquids-A and liquids-B were prepared in accordance with the compounding ratios listed in Tables I-A, I-B and I-C. These liquids-A and liquids-B were joined together, respectively, and their gelation times were measured as indicated in Tables mentioned above.

Table I-A

| Liquid-A (50 cc) | | Liquid-B (50 cc) (Gelation time; 47 min/15° C) | | | Gelation time of AB-liquid | |
|---|---|---|---|---|---|---|
| Gelling agent | Water | No. 3 water glass (Specific gravity 1.4) cc | Gelling agent | Water | min(') | sec('') |
| Phosphoric acid 2 cc | Remainder | 15 | Ethylene Glycol diacetate 1.5 | Remainder | 5' | |
| Phosphoric acid 2.5 cc | " | " | " | " | 1' | |
| Sodium primary phosphate 4g | " | " | " | " | 4' | |
| Sodium primary phosphate 6g | " | " | " | " | | 50'' |

Table I-B

| Liquid-A (50 cc) | | | Liquid-B (50 cc) (Gelation time: 47 min/15° C) | | | Gelation time of liquid-AB min(') sec('') |
|---|---|---|---|---|---|---|
| Cement (g) | Bentonite (g) | Water | No. 3 water glass (specific gravity 1.4) | Gelling agent | Water | |
| 10 | 1 | Remainder | 15 | Ethylene glycol diacetae 1.5 | Remainder | 3' 20'' |
| 8 | 0.8 | " | " | " | " | 4' 30'' |
| 5 | 0.5 | " | " | " | " | 7' 10'' |
| 2.5 | 0.25 | " | " | " | " | 0' 19'' |
| 2.5 | 2.5 | " | " | " | " | 0' 45'' |

Table I-C

| Liquid-A (50cc) | | | Liquid-B (50cc) | | | Gelation time of liquid-B (15 C) | Gelation time of liquid-AB min(') sec('') |
|---|---|---|---|---|---|---|---|
| Cement | Bentonite | Water | No. 3 water grass (specific gravity 1.4) cc | Gelling agent | Water | | |
| 10 g | 1 g | Remainder | 15 | Ethylene glycol diacetate 1.5 g | Remainder | 47 minutes | 3' 20'' |
| " | " | " | 12.5 | Gamma-butyl-lactone 1.5 g | " | 60 minutes | 3' 30'' |
| " | " | " | 12.5 | Ethylene carbonate 2 g | " | 50 minutes | 1' 10'' |
| " | " | " | 12.5 | phosphoric acid 1.5 g | " | 45 minutes | 4' 20'' |
| " | " | " | 12.5 | Sodium aluminate 1.5 g | " | 55 minutes | 3' 05'' |
| " | " | " | 12.5 | Acetic acid 1.5 g | " | 30 minutes | 2' 30'' |
| " | " | " | 12.5 | Sodium acetate 3.0 g | " | 60 minutes | 3' 10'' |

As is clear from Tables I-A, I-B and I-C, the gelation time of a liquid obtaining by joining an liquid-A and a liquid-B is much shorter than that of the liquid-B.

2. A test construction was conducted by applying the method of this invention to a gravel layer with subterrean water in a river bed.

liquid-A (50 l): 25 Kg of cement, 2.5 Kg of bentonite, and the rest being water.

liquid-B (50 l): 15 l of No. 3 water glass, 1.5 l of ethylene glycol diacetate, and 33.5 l of water.

The liquid-A and the liquid-B thus prepared were supplied at the same flow rate (15 l/min) to a Y-shaped pipe to be joined together, and were injected into the layer by an injection pipe. The gravel layer included subterranean water, and the field permeable test resulted in the coefficient of permeability $K = 6.2 \times 10^{-2}$ cm/sec before the injection. However, the coefficient of permeability was changed into $K = 2.5 \times 10^{-5}$ cm/sec after the injection of the liquid obtained by joining the liquid-A and liquid-B. Thus, it was proved that the soil could be improved into a sufficiently watertight soil.

After the injection, the soil was drilled so as to detect the conditions of the soil. As a result, it was found that the liquid-AB, that is, the liquid obtained by joining the liquid-A and liquid-B was consolidated in the coarse soil layer thereof, and the liquid-B was consolidated in the fine soil layer. No leakage of the liquid-B into the unnecessary portions in the soil was found.

EXAMPLE 2

Another test was performed by applying the method of this invention to an excavating place in Tokyo, Japan, where the fine sand layer and the coarse sand layer were mutually overlapped.

liquid-A (50 l): 10 Kg of cement, 1 Kg of bentonite, and the rest being water.

liquid-B (50 l): 15 l of water glass, 1.5 l of ethylene glycol diacetate, and 33.5 l of water.

The liquid-A and the liquid-B thus prepared were supplied at the same flow rate (10 l/min) to a Y-shaped pipe to be joined together, that is, to form the liquid-AB, which were injected into the soil with an injection pipe. After the injection of the liquid-AB at a flow rate of 20 l/min, the injection of the liquid-A was suspended and 3000 of the liquid-B only was injected at a flow rate of 10 l/min.

After the injection, the soil was drilled to observe the conditions of the soil. As a result, it was found that the cement and bentonite consolidated concentrating to the interface of the layers and the coarse sand layer, and that the fine sand layer and the portion of the coarse sand layer where no cement and bentonite were permeated were consolidated over a wide range thereof with the aid of the water glass. No leakage of the liquid-B into the unnecessary portions in the soil was found.

According to the field permeable tests, the coefficients of permeability K of the coarse sand layer and of the fine sand layer was $2.8 \times 10^{-2}$ cm/sec. and $4.8 \times 10^{-3}$ cm/sec., respectively, before the injection, and were changed into $6.7 \times 10^-$ cm/sec. and $1.3 \times 10^{-6}$ cm/sec., respectively, after the injection. The result of a standard sounding test was N = 5 to 10 before the injection, but it was improved to N = 18 to 26 after the injection. Thus, it was confirmed that the method according to this invention has an excellent injection effect.

EXAMPLE 3

An injection test according to the method of this invention was conducted to a humus soil.

The following hardeners were prepared as indicated:
liquid-A (per 100 l): 40 Kg of cement, 5 Kg of bentonite, and the rest of water
liquid-B' (per 100 l): 30 l of No. 3 water glass, and 70 l of water liquid-B (per 103 l): 30 l of No. 3 water glass, and 3 l of ethylene glycol diacetate, and 70 l of water Preparation were made so that the liquid-A and liquid-B' thus prepared were supplied to a Y-shaped pipe by the respective pumps to be joined together, and that the liquid obtained by this joining could be injected to the soil. First of all, 1000 l of the liquid-A only was injected at a flow rate of 15 l/min., and then the liquid-B' was joined with the liquid-A by feeding the former at a flow rate of 15 l/min., thus injecting the total quantity 1000 l of the liquid-A and the liquid-B'. Then, the liquid-B' was changed into the liquid-B by adding the ethylene glycol diacetate. The injection of the liquid-A was suspended, and 2000 l of the liquid-B was injected at a flow rate of 15 l/min.

According to the field permeable tests, the coefficient of permeability K was $3.8 \times 10^{-1}$ cm/sec. before the injection, and was $6.9 \times 10^{-6}$ cm/sec. after the injection. The humus soil thus treated was bored to observe the conditions thereof. As a result, it was found that the cement and bentonite consolidated (the consolidation of the liquid obtained by joining the liquid-A and the liquid-B') in the large air gaps (the coarse soil layer) in the humus soil layer, and that the other portion in the soil were completely consolidated with the aid of the water glass grout (the fine soil layer).

EXAMPLE 4

Portland cement was added in a No. 3 water glass aqueous solution by varying the quantity of the Portland cement for every measurement, and the resultant mixture was agitated, so as to measure the gelation time thereof. The gelation times thus measured are listed in Table 2 (Experiment 1).

Table 2

| No. 3 water glass aqueous solution (cc) | Water (cc) | Cement (g) | Gelation time Minute(') Second(") (20° C) |
|---|---|---|---|
| 25 | 75 | 1 | 58' |
| " | " | 2 | 35' |
| " | " | 5 | 8' |
| " | " | 10 | 2' 15" |
| " | " | 15 | 1' 15" |
| " | " | 20 | 55" |

Fifty g of Portland cement was added into 100 cc. of water, and these materials were mixed to form a mixture solution. Fifty cc. of the mixture solution thus formed was employed as the liquid-A. Furthermore, 25 cc. of No. 3 water glass, 75 cc. of water, and 1 g of cement were mixed to obtain a mixture solution, 50 cc. of which was employed as the liquid-B. When the liquid-A and the liquid-B thus obtained were joined together, the resultant liquid was gelatinized in 1 minute and 10 seconds, while the gelation time of the liquid-B only was 60 minutes (Experiment 2).

An injection test was conducted for a soil formed by a gravel layer and a sand layer in Tokyo, Japan.

An liquid-A and a liquid-B were prepared as described with respect to Experiment 2. The liquid-A and the liquid-B thus prepared were fed, at the same rate of 15 l/mm, to a Y-shaped pipe to join these two liquids together, and the resultant liquid was injected into the soil. After 5000 l of the liquid was injected thereinto, the feeding of the liquid-A was suspended and 500 l of the liquid-B was injected. Upon investigation of the soil by drilling a hole therein, it was found that that the water glass hardener more in cement quantity was essentially filler in the gravel layer, while the water glass hardener less in cement quantity was essentially filled in the sand layer, that is, no part of the materials injected flowed away and the soil injected with the hardeners was in its entirely consolidated into one unit.

EXAMPLE 5

Fifty (50) g. of Portland cement was mixed with 100 cc. of water to obtain a mixture, 50 cc. of which was employed as an liquid-A.

A mixture obtained by mixing 25 cc. of No. 3 water glass, 75 cc. of water and 2 g. of cement was agitated and then allowed to stand for three minutes. The supernatant liquid of 50 cc. of the mixture thus treated was employed as a liquid-B. When the liquid-A and the liquid-B were mixed, the resultant liquid was gelatinized in 50 seconds. (Experiment 1)

In addition, 50 g. of Portland cement was mixed with 100 cc. of water to obtain a mixture, 50 cc. of which was employed at an liquid-A similarly as in the above case. A mixture obtained by mixing 50 g. of Portland cement and 100 cc. of water was agitated for two minutes and then allowed to stand for three minutes. Thereafter, 50 cc. of the supernatant liquid of the mixture thus obtained was mixed with 50 cc of a mixture obtained by mixing 25 cc. of water glass and 25 cc. of water, thereby providing a mixture of 100 cc. This mixture was divided into two parts, a first part being employed as a liquid-B while second part being allowed to stand. When the liquid-A and the liquid-B were mixed, the resultant liquid was gelatinized in 50 seconds. On the other hand, the second part allowed to stand still was gelanitized in 80 minutes (Experiment 2).

An injection test was given to a soil formed by a coarse sand layer and a fine sand layer in Tokyo, Japan.

An liquid-A and a liquid-B were prepared in accordance with those described with reference to the Experiment 1. The liquid-A and the liquid-B fed, at a rate of 10 l/min, by the respective pumps were joined together by a Y-shaped pipe, and the resultant liquid, or an liquid-AB, was injected into the soil with an injection pipe. After the injection of approximately 200 l of the liquid-AB, the feeding of the liquid-A was suspended, and 400 l of the liquid-B was injected to the soil.

After the completion of the injection, the soil was bored for investigation. As a result, it was found that the coarse sand layer was filled with a consolidated water glass mixed with cement, while the fine sand layer was essentially filled with the gel of water glass not mixed with cement. That is, it was confirmed that the soil injected with the hardeners was, in its entirety, consolidated.

EXPERIMENT 6

An injection test under high pressure was given to a poor quality soil formed by a slit clay layer in Tokyo, Japan.

A hole 100 mm in diameter and 10 m in depth was bored in the soil. An outer pipe 90 mm in diameter (a rod pipe having an open end of injecting an liquid-A) was inserted into the hole, and an inner pipe 40 mm in diameter (having a closed end on the wall of which are provided with nozzle holes for injecting a liquid-B) was coaxially inserted into the outer pipe, thus providing a dual pipe. More specifically, on the wall part of the end portion of the inner pipe there were provided with two nozzle hole so that the jet stream of the liquid-B could be jetted perpendicularly to the longitudinal axis of the pipe, and the insertion of the inner pipe was achieved in such a manner that the end portion of the inner pipe was protruded from the outer pipe.

Hardeners (or the liquid-A and the liquid-B) to be injected into the poor quality soil were prepared as follows: Preparation of the liquid-A: 400 kg of cement and 40 g of bentonite were compounded with water to obtain a mixture of 1 m³. Preparation of the liquid-B: 250 l of water glass and 344 of ethylene glycol diacetate (a gelling agent) were compounded with water to obtain a mixture of 1 m³. (This mixture will gelatinize in approximately 60 minutes.) When the liquid-A and liquid-B are joined together, the resultant liquid will consolidate in about 40 seconds.

The liquid-B thus prepared was injected, under a high pressure of 200 kg/cm², through the inner pipe which was rotating, while the liquid-A was also injected at a pressure of 10 kg/cm² through the outer pipe. In this operation, the solid was cut and loosened by the jet stream of the liquid-B, and simultaneously the liquid-A was injected into the cut and loosened portion of the soil, as a result of which the liquid-A and the liquid-B were joined in the cut and loosened portion of the soil.

Then, the cutting and loosening operation of the soil and the joining and injecting operation of the two liquid were continued while the dual pipe was gradually moved upward. Soon, the cut and loosened portion of the soil was consolidated to form a column-like consolidated body.

According to the investigation made by drilling a hole in the soil, it was found that the portion of the column-like consolidated body covered by its diameter 30 cm was essentially formed with cement and the rest was essentially formed with water glass, and that as whole, both of the coarse soil layer and the fine soil layer were modified into one uniformly consolidated body. This means that the liquid-A essentially permeated, as a hardener, the coarse soil layer while the liquid-B essentially permeated, as a hardener, the fine soil layer. According to a laboratory test, the consolidated body showed a compression strength of approximately 80 kg/cm². In addition, no leakage of the liquid-B was observed. All of the hardeners were consolidated, and therefore there was no problem which might cause a public hazard such as a water polution.

EXAMPLE 7

Similarly as in Example 6, an injection test was applied to a poor quality soil (a water leaking soil) formed by a slit clay layer in Tokyo, Japan.

Five holes, each having a 100 mm diameter and a 10 m depth, on one straight line were bored at intervals of 80 cm in the soil. In addition, two injection pipes were prepared. One (hereinafter referred to as a pipe A when applicable) of the two injection pipes had a 40mm diameter and an open end, the other (hereinafter referred to as a pipe B when applicable) had a 40 mm diameter and a closed end portion. However, the opposite walls of the closed end portion of the pipe B was provided with two nozzle holes. These two pipes arranged in parallel were inserted into each hole bored in the soil in such a manner that the end of the pipe B (nozzle holes) was positioned deeper than the end of the pipe A and the nozzle holes were faced toward the adjacent holes bored in the soil.

The same liquid-A and liquid-B as those in Example 6 were employed.

The liquid-B was injected at a high pressure of 200 kg/cm² through all of the pipes B into, the soil, and simultaneously the liquid-A was injected at a pressure of 5 kg/cm² through all of the pipes A into the soil. In this opearation, the soil was cut and loosened in the direction obtained by connecting the five holes, and therefore the liquid-A and liquid-B were joined in the cut and loosened portion of the soil.

Furthermore, the joining and injecting operation of the liquid-A and the liquid-B and the cutting and loosening operation of the soil were continued while the pipes A and B were gradually move upward. Soon, the cut and loosened portion of the soil was consolidated to form a consolidated film 30 cm in width and 4 m in length.

According to the investigation made by digging the soil, it was observed that the central portion, 10 cm width, of the consolidated film was formed by a consolidated body essentially having cement, the rest portion thereof was formed by a consolidated body essentially having water glass, and that as a whole, both of the coarse soil layer and the fine soil layer were modified into an uniformly consolidated body (a multiple grout) thereby to completely stop the leakage of water. This means that a hardener essentially having the liquid-A permeated the coarse soil layer, while a hardener essentially having the liquid-B permeated the fine soil layer. According to a laboratory test, the consolidated body showed a compression strength of about 80 kg/cm².

In addition, no leakage of the liquid-B was observed. All of the liquid-A and the liquid-B were consolidated, and accordingly there was no trouble which might cause a public harzard such as water pollution.

EXAMPLE 8

Described herein is an example in which the present invention was applied to a tunnel construction. Owing to the application of the invention, in this tunnel construction the sand guard effect and the water stoppage effect could be obtained thereby safely cutting the tunnel.

The invention was applied to a tunnel test construction in Tokyo, Japan.

Eight horizontal holes, each being 10 m long, were drilled on the circumferential surface of a cylinder 5 meters in diameter having its central horizontal axis at 8 meters below the surface of the earth. The same dual pipes as in Example 6 were inserted into the eight horizontal holes thus drilled, respectively. In this case, a steel bar (as a tension member) was inserted into each of the dual pipe.

The same liquid-A and liquid-B as those in Example 6 were prepared. First, similarly as in the case of Experiment 6 the liquid-B was jetted at a pressure of 200 kg/cm$^2$ in one direction (without rotation) through the inner pipe of the dual pipe, and simultaneously the liquid-A was injected whereby the two liquids were joined together. Then, the dual pipes were removed from the holes by leaving the steel bar there.

According to the investigation performed after the completion of the injection according to the invention, it was observed that a column-shaped consolidated body about 30 cm in diameter essentially including cement mortar was formed horizontally around the drilled hole.

Since this column-shaped consolidated body had the steel bar which would serve as a tension member, the strength of the consolidated body obtained according to this invention was very great.

Accordingly, the consolidated body served as a sand guard beam. Furthermore, a zone or area into which the hardener essentially containing water glass continuously connected between the column-shaped consolidated bodies thus formed a water stoppage region. That is, in this tunnel construction, the sand guard effect and the water stoppage effect were obtained whereby the soil could be securely dug and accordingly the tunnel construction was smoothly carried out.

In addition, the steel bar described above may be inserted into the liquid which was obtained by joining the liquid-A and the liquid-B and injected into the hole, before the consolidation of the liquid. In other words, first and liquid-A and the liquid-B are injected into the hole, and before the liquid obtained by joining the liquid-A and the liquid-B are consolidated, the steel bar is inserted into the liquid in the hole by hammering it.

I claim

1. In a method of consolidating a poor quality soil by injecting hardeners thereinto, in which a mixture of water and a gelling agent and a water glass aqueous solution containing a gelling agent are employed as the hardeners, the improvement comprising the steps of joining the hardeners together to form a resultant liquid, injecting the resultant liquid obtained by joining the hardeners into the soil, and during the injection, suspending the joining operation of the mixture of the water and gelling agent and only continuously injecting the water glass aqueous solution containing gelling agent into the soil.

2. In a method of consolidating a poor quality soil as set forth in claim 1, wherein the gelation time of the resultant liquid obtained by joining the hardeners is substantially shorter than the gelation time of said water glass aqueous solution containing a gelling agent.

3. In a method of consolidating a poor quality soil by injecting hardeners thereinto, as set forth in claim 2, wherein the stop of continuously injecting the water glass aqueous solution containing gelling agent is performed before the resultant liquid which has been injected into the soil has completely cured.

4. The method as claimed in claim 1, in which a first step of injecting said resultant liquid into said soil and a second step of suspending the joining operation of said mixture after the first step are repeatedly carried out.

5. A method of consolidating a poor quality soil by injecting hardeners thereinto, in which a mixture of water and a gelling agent and a water glass aqueous solution without a gelling agent are employed as said hardeners, said hardeners are joined together and liquid being injected into said soil, and during the injection said water glass aqueous solution is modified into a water glass aqueous solution containing gelling agent and thereafter the joining operation of said mixture of water and gelling agent is suspended thereby to successively inject only said water glass aqueous solution containing the gelling agent.

6. The method as claimed in claim 5, in which a series of steps of injecting said resultant liquid into said soil, of modifying said water glass aqueous solution without the gelling agent into said water glass aqueous solution with the gelling agent, and of suspending the joining operation of said mixture of the water and the gelling agent are repeatedly carried out.

* * * * *